United States Patent
Tiwari

(10) Patent No.: US 10,327,270 B2
(45) Date of Patent: Jun. 18, 2019

(54) DEVICE AND METHOD FOR HANDLING A FEATURE

(71) Applicant: HTC Corporation, Taoyuan (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/969,794

(22) Filed: May 3, 2018

(65) Prior Publication Data

US 2018/0324877 A1    Nov. 8, 2018

Related U.S. Application Data

(60) Provisional application No. 62/503,316, filed on May 8, 2017.

(51) Int. Cl.

| | |
|---|---|
| H04W 4/50 | (2018.01) |
| H04L 29/06 | (2006.01) |
| H04W 48/12 | (2009.01) |
| H04W 48/14 | (2009.01) |
| H04W 48/18 | (2009.01) |
| H04W 76/10 | (2018.01) |
| H04W 76/18 | (2018.01) |
| H04W 84/04 | (2009.01) |

(52) U.S. Cl.
CPC .......... *H04W 76/10* (2018.02); *H04L 63/108* (2013.01); *H04W 48/12* (2013.01); *H04W 48/14* (2013.01); *H04W 48/18* (2013.01); *H04W 76/18* (2018.02); *H04W 4/50* (2018.02); *H04W 84/042* (2013.01)

(58) Field of Classification Search
None
See application file for complete search history.

(56) References Cited

U.S. PATENT DOCUMENTS

| 2012/0178457 A1* | 7/2012 | Liao | H04W 76/18 455/437 |
|---|---|---|---|
| 2018/0270666 A1* | 9/2018 | Lee | H04L 63/205 |
| 2018/0324602 A1* | 11/2018 | Griot | H04W 48/18 |
| 2018/0324761 A1* | 11/2018 | Velev | H04W 72/04 |

OTHER PUBLICATIONS

Search Report dated Jul. 31, 2018 for EP application No. 18171099.7, pp. 1-4.
3GPP TR 23.799 V14.0.0 (Dec. 2016), "3rd Generation Partnership Project; Technical Specification Group Services and System Aspects; Study on Architecture for Next Generation System (Release 14)", XP051295448, pp. 1-522.
3GPP TS 23.501 V0.4.0 (Apr. 2017), "3rd Generation Partnership Project; Technical Specification Group Services and System Aspects; System Architecture for the 5G System; Stage 2 (Release 15)", XP051298169, pp. 1-123.
3GPP TS 23.501 V0.4.0 (Apr. 2017) Technical Specification, 3rd Generation Partnership Project; Technical Specification Group Services and System Aspects; System Architecture for the 5G System; Stage 2 (Release 15).
3GPP TS 24.301 V14.3.0 (Mar. 2017) Technical Specification, 3rd Generation Partnership Project; Technical Specification Group Core Network and Terminals; Non-Access-Stratum (NAS) protocol for Evolved Packet System (EPS); Stage 3 (Release 14).

* cited by examiner

Primary Examiner — Jutai Kao
(74) *Attorney, Agent, or Firm* — Winston Hsu

(57) ABSTRACT

The present invention provides methods and devices for a network to inform a user equipment which network slice is attached successfully and which network slice is prohibited to attach.

16 Claims, 4 Drawing Sheets

DEVICE AND METHOD FOR HANDLING A FEATURE

CROSS REFERENCE TO RELATED APPLICATIONS

This application claims the benefit of U.S. Provisional Applications No. 62/503,316 filed on May 8, 2017, which is incorporated herein by reference.

BACKGROUND OF THE INVENTION

1. Field of the Invention

The present invention relates to a device and a method used in a wireless communication system, and more particularly, to a device and a method of handling a feature in a wireless communication system.

2. Description of the Prior Art

A network transmits an indication indicating whether a feature is supported by the network or not or whether a feature requested by a communication device is allowed or not, to the communication device. These features may not be available temporarily at the network. Since the network does not indicate how long the feature is not available to the communication device, the communication device may transmit a message for requesting the service that was rejected earlier and unnecessary signaling overhead is caused.

SUMMARY OF THE INVENTION

The present invention therefore provides a communication device for handling a feature to solve the abovementioned problem.

A network for handling a feature comprises at least one storage device for storing instructions and at least one processing circuit coupled to the at least one storage device. The at least one processing circuit is configured to execute the instructions stored in the at least one storage device. The instructions comprise receiving a first non-access stratum (NAS) message comprising a first information element (IE) and a second IE, from a communication device, wherein the first IE identifies a first network slice, and the second IE identifies a second network slice; and transmitting a second NAS message comprising a third IE, a fourth IE and a fifth IE, to the communication device, wherein the third IE indicates that the communication device is attached to the first network slice successfully, the fourth IE indicates that the communication device is not attached to the second network slice, and the fifth IE comprises a first timer value indicating a first time period for which the second network slice is not available to be attached, in response to the first NAS message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
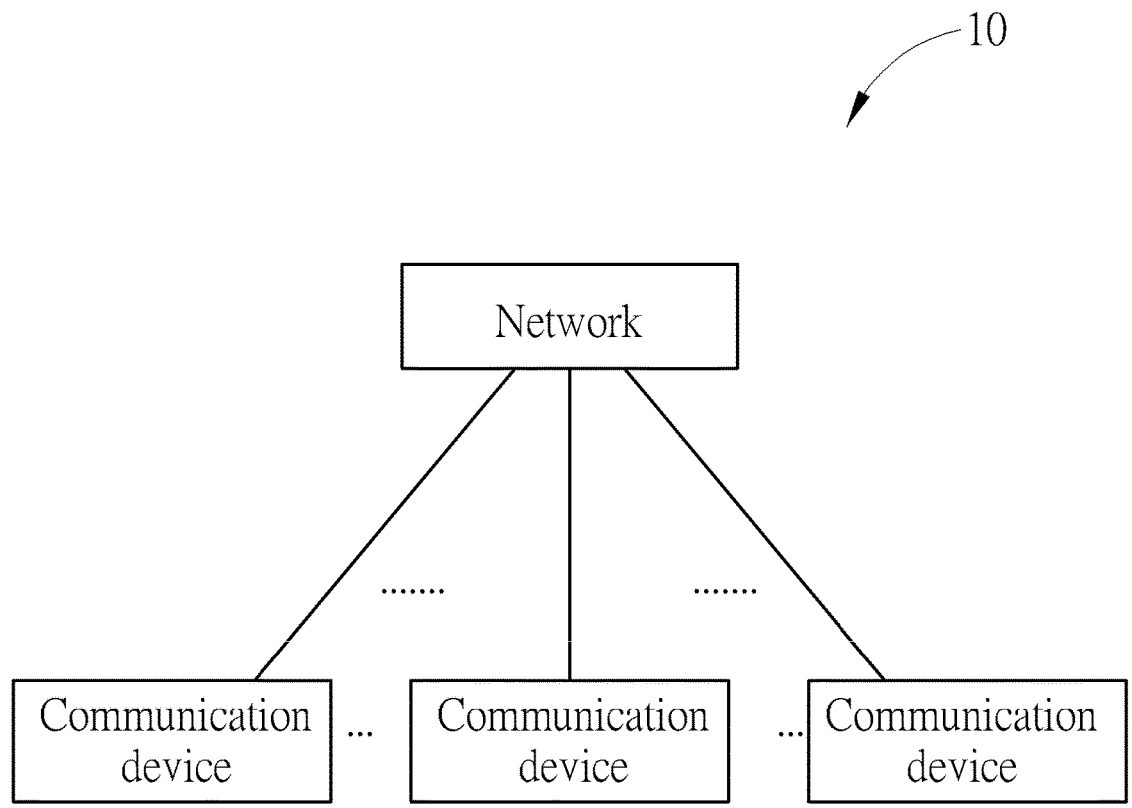
FIG. 1 is a schematic diagram of a wireless communication system according to an example of the present invention.

In FIG. 1, a network and communication devices are simply utilized for illustrating the structure of a wireless communication system 10. Practically, the network comprises at least one of a long-term evolution (LTE) network, a new radio (NR) network and a sixth generation (6G) network. The LTE network comprises at least one of an evolved universal terrestrial radio access network (E-UTRAN) including at least one evolved Node-B (eNB) and an Evolved Packet Core (EPC). The NR network comprises a fifth generation (5G) radio access network including at least one 5G BS (called gNB or an evolved eNB (eLTE eNB)) and a Next Generation Core (NGC). The 6G network includes at least one 6G BS and a NGC or 6G Core.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
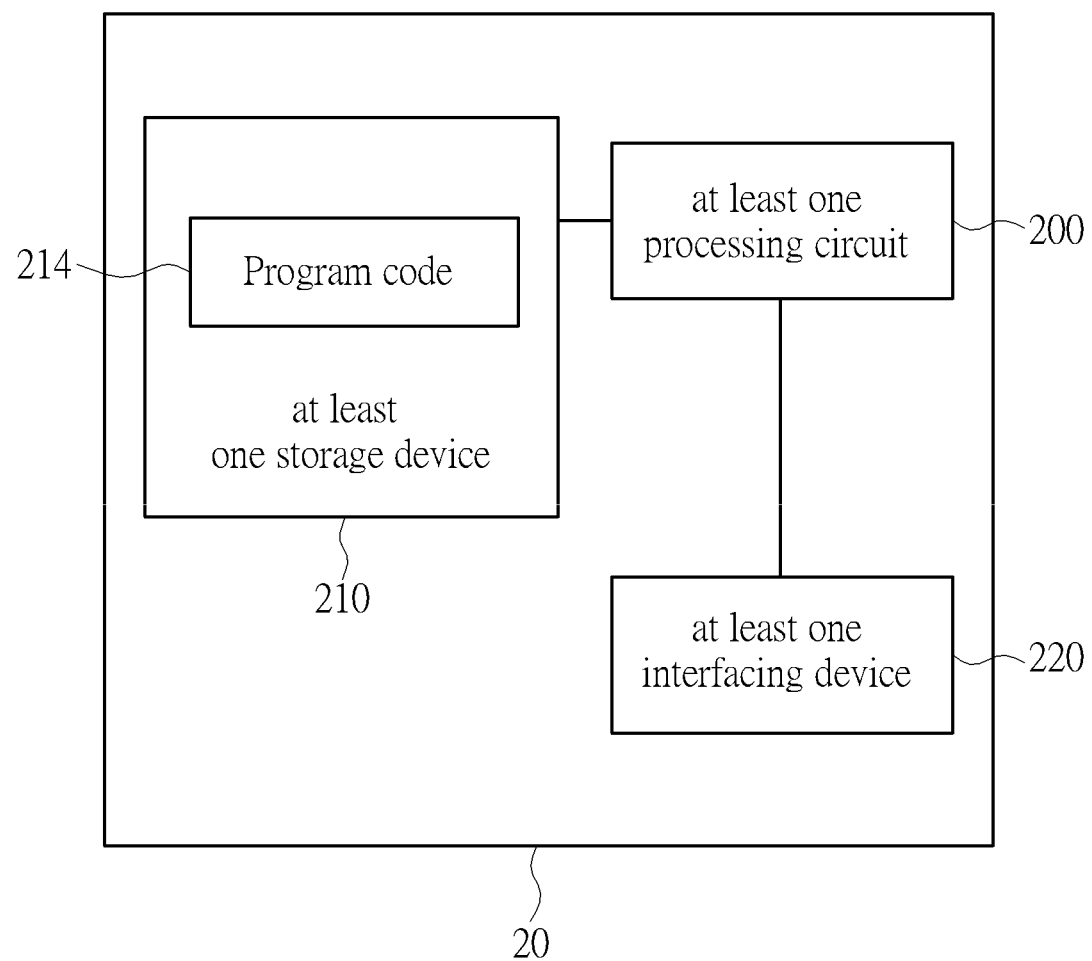
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 comprises at least one transceiver used to transmit and receive signals (e.g., data, messages and/or packets) according to processing results of the at least one processing circuit 200.

In the following embodiments, a UE is used for representing a communication device in FIG. 1, to simplify the illustration of the embodiments.

Figure 3:
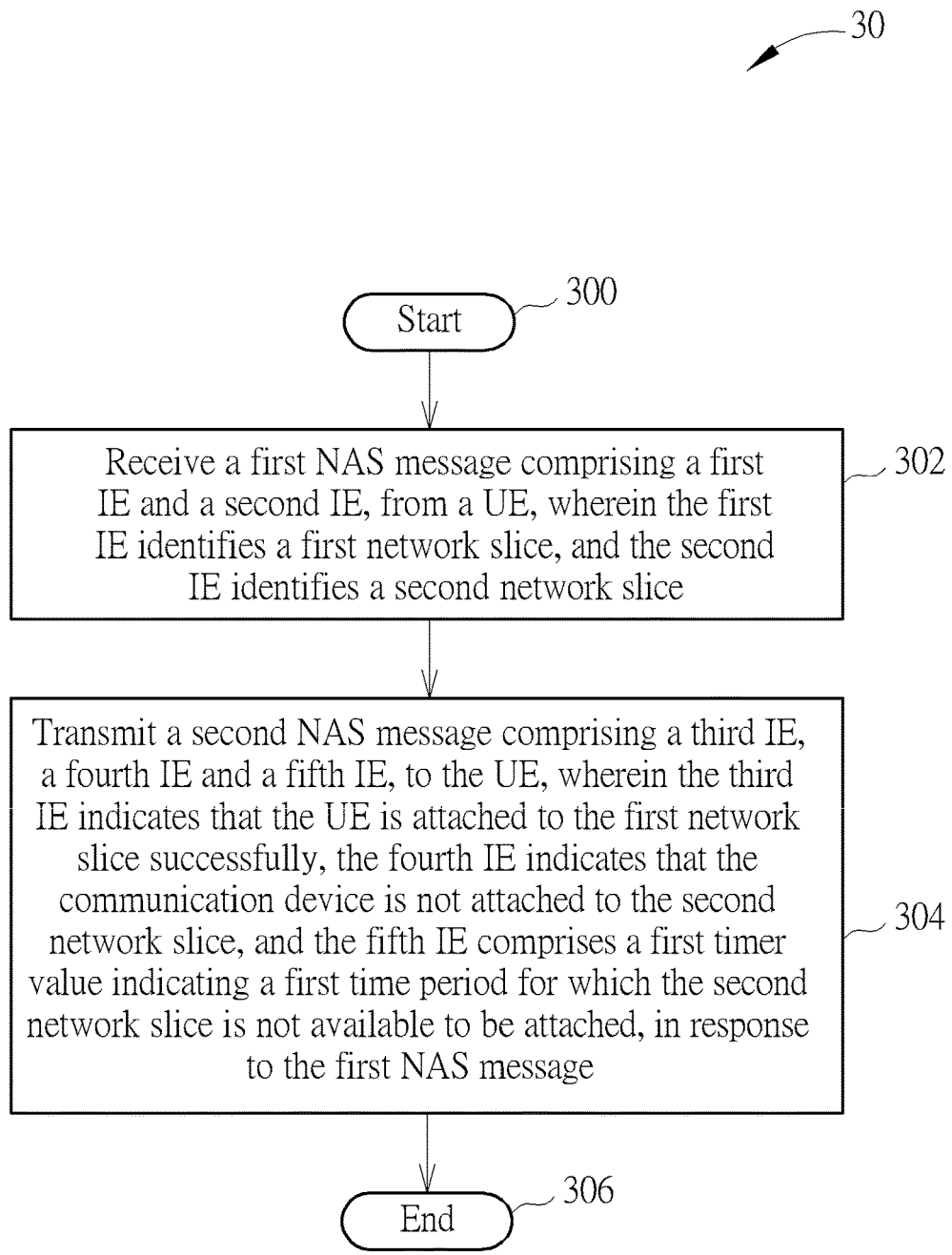
FIG. 3 is a flowchart of a process according to an example of the present invention.

A process 30 in FIG. 3 is utilized in a network, and includes the following steps:

Step 300: Start.

Step 302: Receive a first non-access stratum (NAS) message comprising a first information element (IE) and a second IE, from a UE, wherein the first IE identifies a first network slice, and the second IE identifies a second network slice.

Step 304: Transmit a second NAS message comprising a third IE, a fourth IE and a fifth IE, to the UE, wherein the third IE indicates that the UE is attached to the first network slice successfully, the fourth IE indicates that the communication device is not attached to the second network slice, and the fifth IE comprises a first timer value indicating a first time period for which the second network slice is not available to be attached, in response to the first NAS message.

Step 306: End.

According to the process 30, after receiving the first NAS message from the UE requesting attaching to the first network slice and the second network slice, the network informs the UE that the first network slice is attached successfully and the second network slice is prohibited to attach. The unnecessary requests from the UE can be avoided or reduced.

The following examples may be applied to the process 30.

In one example, the first NAS message is a registration request message, an attach request message or a tracking area update request message. In one example, the second NAS message is a registration accept message, an attach accept message or a tracking area update accept message. In one example, the first IE comprises a single network slice selection assistance information (S-NSSAI) identifying the first network slice. The second IE comprises a S-NSSAI identifying the second network slice. In one example, the first IE and the second IE are encoded and transmitted as a single IE, wherein the single IE comprises a network slice selection assistance information (NSSAI). In one example, the first IE and the second IE are encoded and transmitted separately.

In one example, the third IE comprises a S-NSSAI identifying the first network slice and a first value indicating that the UE is attached to the first network slice successfully. In one example, the fourth IE comprises a S-NSSAI identifying the second network slice and a second value indicating that the UE is not attached to the second network slice.

In one example, the second NAS message comprises a sixth IE comprising a second timer value indicating a second time period for (e.g., in) which the UE is available to attach to the first network slice. In one example, the network accepts any service for the first network slice for (e.g., in) the second time period indicated in the sixth IE.

In one example, the network rejects the UE for attaching to the second network slice in the first time period indicated in the fifth IE. In one example, the first timer value and the second timer value comprise time value in milliseconds, seconds, hours, etc.).

In one example, the network calculates the timer values based on a user subscription, local configuration of the network, network policies or any combination of above. The network sets a longer value for a timer value for a user whose subscription indicates that it is a low priority user. The network sets a shorter value for a timer value for a user whose subscription indicates that it is a high priority user. If the local configuration of the network indicates that there is less resource in the network, the network sets a longer value for the time value.

Figure 4:
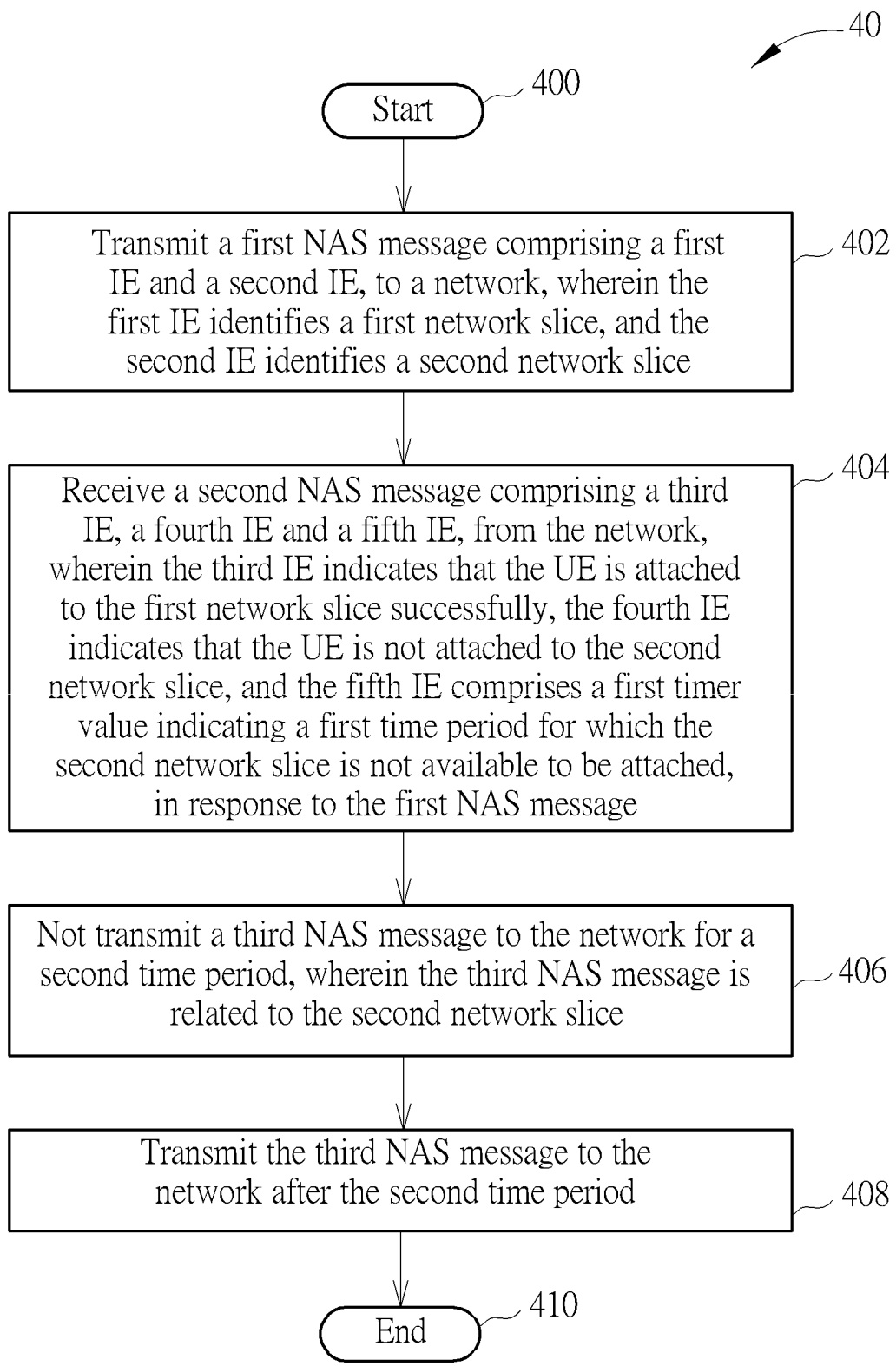
FIG. 4 is a flowchart of a process according to an example of the present invention.

A process 40 in FIG. 4 is utilized in a UE, and includes the following steps:

Step 400: Start.

Step 402: Transmit a first NAS message comprising a first IE and a second IE, to a network, wherein the first IE identifies a first network slice, and the second IE identifies a second network slice.

Step 404: Receive a second NAS message comprising a third IE, a fourth IE and a fifth IE, from the network, wherein the third IE indicates that the UE is attached to the first network slice successfully, the fourth IE indicates that the UE is not attached to the second network slice, and the fifth IE comprises a first timer value indicating a first time period for which the second network slice is not available to be attached, in response to the first NAS message.

Step 406: Not transmit a third NAS message to the network for a second time period, wherein the third NAS message is related to the second network slice.

Step 408: Transmit the third NAS message to the network after the second time period.

Step 410: End.

According to the process 40, since the UE is informed of the unavailability to attach to the second network slice by the network, the UE temporarily suspends transmitting the NAS message related to the second network slice, which reduces the unnecessary request from the UE.

The following examples may be applied to the process 40.

In one example, the first NAS message is a registration request message, an attach request message or a tracking area update request message. In one example, the second NAS message is a registration accept message, an attach accept message or a tracking area update accept message. In one example, the first IE comprises a S-NSSAI identifying the first network slice. The second IE comprises a S-NSSAI identifying the second network slice. In one example, the first IE and the second IE are encoded and transmitted as one IE comprising a NSSAI. In one example, the first IE and the second IE are encoded and transmitted separately.

In one example, the third IE comprises a S-NSSAI identifying the first network slice and a first value indicating that the UE is attached to the first network slice successfully. In one example, the fourth IE comprises a S-NSSAI identifying the second network slice and a second value indicating that the UE is not attached to the second network slice.

In one example, the second NAS message comprises a sixth IE comprising a second timer value indicating a third time period for which the UE is available to attach to the first network slice (e.g., to get service from the first network slice). In one example, the UE transmits user data on data radio bearers (DRBs) to use a service related to the first network slice for (e.g., in) the third time period indicated in the sixth IE, to the network. After the third period, the UE stops transmitting the user data related to the second network slice to the network, transmits (e.g., initiates) the third NAS message to attach to the second network slice and transmits the user data related to the second network slice.

In one example, the UE receives a fourth NAS message from the network, in response to the third NAS message, wherein the fourth NAS message indicates that the UE is attached to the second network slice successfully. The UE transmits data related to the second network slice on the DRBs.

In one example, the network configures the first time period by transmitting the first timer value in the second NAS message. When the network does not provide the first time period in the second NAS message, the UE applies a default value for the first time period.

The following examples may be applied to the processes 30 and 40.

In one example, the first network slice and the second network slice comprise network nodes (e.g., radio access network (RAN), 5G Core and Data network) providing Internet Protocol (IP) Multimedia Subsystem (IMS) service (e.g., IMS emergency voice service or emergency bearer service) or Cellular Internet of Things (CIoT) (e.g., user plane CIoT evolved packet system (EPS) optimization, control plane CIoT EPS optimization or attach without packet data network (PDN) connectivity), Internet service (e.g., hypertext transfer protocol (HTTP), file transfer protocol (FTP), etc.) mobile initiated connection only (MICO) mode service, location service (LCS) or short message service (SMS).

In one example, the UE transmits a registration request message to the network for requesting to attach to an IMS network slice and a CIoT network slice. The network transmits a registration accept message indicating that the UE is attached to the IMS network slice successfully and indicating that the UE fails to be attached to the CIoT network slice. The network transmits a timer value (e.g., 10 seconds) related to the CIoT network slice to the UE, after receiving the registration request message. The UE receives the registration accept message from the network. The UE does not transmit any registration request message related to the CIoT network slice for the time period (e.g., 10 seconds) as received in the registration accept message. After the received time period (e.g., 10 seconds), the UE transmits the registration request message to attach to the CIoT network slice.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling a feature. According to the IE received from the network, the UE does not transmit the NAS message related to a specific network slice to the network. Unnecessary requests from the UE can be avoided or reduced. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for handling a feature, comprising:
   at least one storage device; and
   at least one processing circuit, coupled to the at least one storage device, wherein the at least one storage device stores, and the at least one processing circuit is configured to execute instructions of:
   receiving a first non-access stratum (NAS) message comprising a first information element (IE) and a second IE, from a communication device, wherein the first IE identifies a first network slice, and the second IE identifies a second network slice; and
   transmitting a second NAS message comprising a third IE, a fourth IE and a fifth IE, to the communication device, wherein the third IE indicates that the communication device is attached to the first network slice successfully, the fourth IE indicates that the commu-nication device is not attached to the second network slice, and the fifth IE comprises a first timer value indicating a first time period for which the second network slice is not available to be attached, in response to the first NAS message.

2. The network of claim 1, wherein the first IE comprises a single network slice selection assistance information (S-NSSAI) identifying the first network slice.

3. The network of claim 1, wherein the second IE comprises a S-NSSAI identifying the second network slice.

4. The network of claim 1, wherein the third IE comprises a S-NSSAI identifying the first network slice and a first value indicating that the communication device is attached to the first network slice successfully.

5. The network of claim 1, wherein the fourth IE comprises a S-NSSAI identifying the second network slice and a second value indicating that the communication device is not attached to the second network slice.

6. The network of claim 1, wherein the second NAS message comprises a sixth IE comprising a second timer value indicating a second time period for which the communication device is available to attach to the first network slice.

7. The network of claim 6, wherein the instructions further comprise:
   accepting any service for the first network slice for the second time period indicated in the sixth IE.

8. The network of claim 1, wherein the instructions further comprise:
   rejecting the communication device for attaching to the second network slice in the first time period indicated in the fifth IE.

9. A communication device for handling a feature, comprising:
   at least one storage device; and
   at least one processing circuit, coupled to the at least one storage device, wherein the at least one storage device stores, and the at least one processing circuit is configured to execute instructions of:
   transmitting a first non-access stratum (NAS) message comprising a first information element (IE) and a second IE, to a network, wherein the first IE identifies a first network slice, and the second IE identifies a second network slice;
   receiving a second NAS message comprising a third IE, a fourth IE and a fifth IE, from the network, wherein the third IE indicates that the communication device is attached to the first network slice successfully, the fourth IE indicates that the communication device is not attached to the second network slice, and the fifth IE comprises a first timer value indicating a first time period for which the second network slice is not available to be attached, in response to the first NAS message;
   not transmitting a third NAS message to the network for a second time period, wherein the third NAS message is related to the second network slice; and
   transmitting the third NAS message to the network after the second time period.

10. The communication device of claim 9, wherein the first IE comprises a single network slice selection assistance information (S-NSSAI) identifying the first network slice.

11. The communication device of claim 9, wherein the second IE comprises a S-NSSAI identifying the second network slice.

12. The communication device of claim 9, wherein the third IE comprises a S-NSSAI identifying the first network slice and a first value indicating that the communication device is attached to the first network slice successfully.

13. The communication device of claim 9, wherein the fourth IE comprises a S-NSSAI identifying the second network slice and a second value indicating that the communication device is not attached to the second network slice.

14. The communication device of claim 9, wherein the second NAS message comprises a sixth IE comprising a second timer value indicating a third time period for which the communication device is available to attach to the first network slice.

15. The communication device of claim 14, wherein the instructions further comprise:
   transmitting user data to use a service related to the first network slice for the third time period indicated in the sixth IE, to the network; and
   stopping transmitting the user data to the network and transmitting the third NAS message, after the third time period.

16. The communication device of claim 9, wherein the instructions further comprise:
   receiving a fourth NAS message from the network, wherein the fourth NAS message indicates that the communication device is attached to the second network slice successfully.

* * * * *